A. HUYSER.
CAMPER'S BAKE PAN OR OVEN.
APPLICATION FILED JAN. 8, 1909.
925,911.
Patented June 22, 1909.
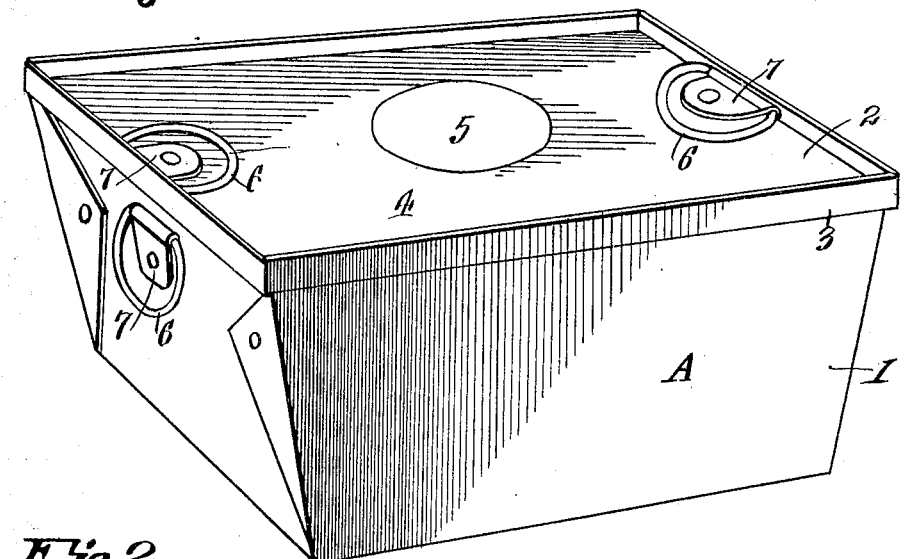
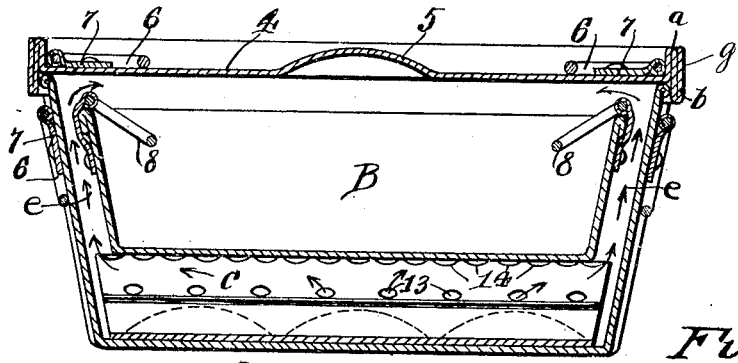
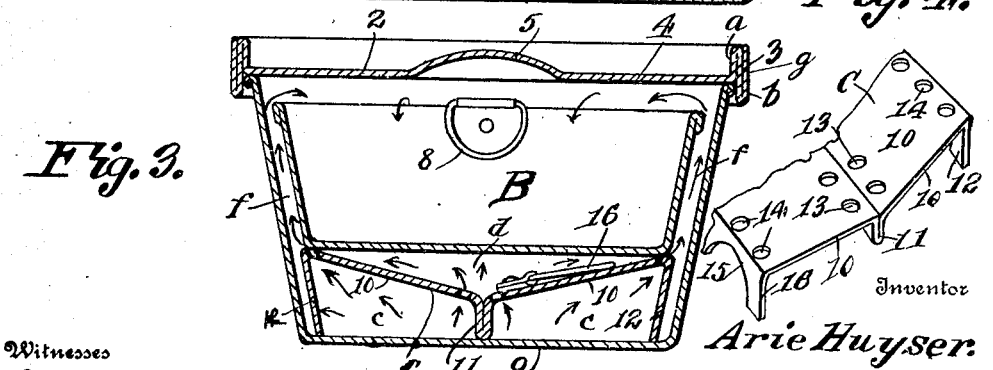
Witnesses
William C. Linton.
C. Bradway.
Inventor
Arie Huyser.
By Victor J. Evans
Attorney

UNITED STATES PATENT OFFICE.

ARIE HUYSER, OF COLORADO SPRINGS, COLORADO.

CAMPER'S BAKE PAN OR OVEN.

No. 925,911.      Specification of Letters Patent.      Patented June 22, 1909.

Application filed January 8, 1909.   Serial No. 471,367.

*To all whom it may concern:*

Be it known that I, ARIE HUYSER, a citizen of the United States, residing at Colorado Springs, in the county of El Paso and State of Colorado, have invented new and useful Improvements in Campers' Bake Pans or Ovens, of which the following is a specification.

This invention relates to a baking pan or oven designed more especially for use by campers, hunters, prospectors, and other persons who cook by camp fires.

The invention has for one of its objects to provide a device of this character which is of comparatively simple and inexpensive construction, of durable and compact arrangement, and so designed as to effect an efficient distribution of heat so as to effectively bake the food at the top as well as the bottom.

Another object of the invention is the provision of a portable bake oven consisting of an outer casing or housing and an inner pan with a removable false bottom that serves to support the pan off the bottom of the oven and also serves to direct the heat in such a manner as to permit the efficient baking of the food.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a perspective view of the device. Fig. 2 is a vertical longitudinal section thereof. Fig. 3 is a vertical transverse section. Fig. 4 is a fragmentary perspective view of the false bottom.

Similar reference characters are employed to designate corresponding parts throughout the views.

Referring to the drawing, A designates the outer section of the device which is preferably in the form of a housing or casing composed of a pan-like sheet metal body 1 and a removable cover 2. This cover is formed with a peripheral rim 3 which extends both above and below the flat plate portion 4 of the cover so that the depending part of the rim will engage around the body 1 of the oven to hold the cover in place against lateral displacement, while the upstanding portion of the rim will form a shallow chamber into which glowing embers can be placed when it is desired to quickly brown the top of the food in the oven. This rim 3 is formed by crimping the marginal portions of the sheet metal plate of which the cover is constructed to form a crimp of three thicknesses, as clearly shown in Figs. 2 and 3, the first crimp $a$ being upstanding, while the second crimp $b$ projects downwardly from the plane of the cover and the third crimp $g$ extends upwardly, the cover being thus provided with a strong and substantial rim that will stand considerable rough usage without being distorted or bent. The central portion of the cover is bulged upwardly at 5 so as to give rigidity thereto and prevent the cover from collapsing under the weight of the hot coals placed thereon. The body 1, as well as the cover 2, is provided with ring handles 6 which are pivotally connected with straps 7 riveted or otherwise secured to the said parts so that the handles can fold down flat against the cover and body when the oven is packed for transportation.

Within the oven or casing A is a pan B of any suitable construction and so proportioned with respect to the oven as to provide an air space entirely around the four sides thereof. This pan is preferably open at the top so that the hot air in the oven can have access to the food to be baked. The pan B, which is also provided with handles designated 8, is supported on a false bottom or rack C. This rack rests on the bottom 9 of the oven or casing A and consists of two oppositely-inclined plate portions 10 having their inner edges lowermost and connected together by a central rib 11 formed by doubling the sheet metal plate of which the bottom is constructed, as clearly shown in Fig. 3. The outer edges of the plate portions 10 are bent downwardly into flanges 12 whose lower edges are coincident with the bottom edge of the central rib 11 so as to rest on the bottom 9 of the oven. The false bottom is provided with apertures 13 extending longitudinally thereof at opposite sides of the rib 11 so as to admit air from the space under the false bottom to the space between the latter and the bottom of the pan B. In other words, the air contained within the oven circulates and passes from the chamber $c$ to the chamber $d$, through the apertures 13, and circulates under the bottom of the pan B toward the ends of the latter, and thence passes upwardly through the passages $e$ to the top of the oven. The false bottom is also provided with apertures 14 adjacent the side edges thereof and the flanges 12 are cut away at 15 so that the heat can pass out of the chamber $c$ to the side spaces $f$ and thence to the top of the oven where the heat will be directed by the cover upon the top of the food in the pan B. It will thus be seen that the heat is effectively circulated around the pan at all points. Should it be desired to hasten the baking of the food at the top, live embers can be placed on the pan-shaped cover so that the heat will pass inwardly directly to the top of the food. The false bottom or rack C is provided with a ring handle 16 that folds flat against one of the plate portions 10 so as not to intereferre with the positioning of the pan B.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. A camper's oven comprising a casing composed of a pan-like body portion and a sheet metal cover having its outer edge portion crimped to provide a peripheral flange of several thicknesses extending upwardly and downwardly, the downwardly-extending portion of the flange serving to engage around the said body portion, and the upwardly-extending portion of the flange serving to retain hot embers on the cover, and a removable holder in the casing for the food.

2. A camper's oven comprising a casing including a removable cover, a food holder in the casing, and a false bottom within the casing for supporting the holder, said false bottom having central and side flanges resting on the bottom of the casing and inclined plate portions between the flanges, there being apertures in the false bottom through which the hot air passes to circulate around the said holder.

3. A camper's oven comprising an outer casing, a food holder in the casing, and a false bottom for supporting the holder off the bottom of the casing, said false bottom consisting of a sheet metal structure having oppositely-inclined plate portions connected by a central rib and formed with side flanges depending therefrom, said plate portions having apertures arranged adjacent the central rib and adjacent the said flanges.

In testimony whereof I affix my signature in presence of two witnesses.

ARIE HUYSER.

Witnesses:
M. A. MILLER,
A. E. THOMSON.